US010652774B2

(12) United States Patent
Wilhelmsson et al.

(10) Patent No.: US 10,652,774 B2
(45) Date of Patent: *May 12, 2020

(54) PREDICTION OF QUALITY OF SERVICE OF A POSSIBLE FUTURE CONNECTION OF A DEVICE TO A WIRELESS NETWORK

(71) Applicant: Telefonaktiebolaget LM Ericsson (publ), Stockholm (SE)

(72) Inventors: Leif Wilhelmsson, Dalby (SE); Filip Mestanov, Brottby (SE); Oscar Zee, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

This patent is subject to a terminal disclaimer.

(21) Appl. No.: 15/896,145

(22) Filed: Feb. 14, 2018

(65) Prior Publication Data
US 2018/0227787 A1 Aug. 9, 2018

Related U.S. Application Data

(63) Continuation of application No. 14/765,888, filed as application No. PCT/EP2014/052527 on Feb. 10, 2014, now Pat. No. 9,930,553.

(Continued)

(30) Foreign Application Priority Data

Feb. 15, 2013 (EP) ..................................... 13155437

(51) Int. Cl.
G06F 15/173 (2006.01)
H04W 24/10 (2009.01)
(Continued)

(52) U.S. Cl.
CPC ....... *H04W 24/10* (2013.01); *H04W 36/0083* (2013.01); *H04W 36/0094* (2013.01);
(Continued)

(58) Field of Classification Search
None
See application file for complete search history.

(56) References Cited

U.S. PATENT DOCUMENTS

2002/0039892 A1 4/2002 Lindell
2004/0039817 A1* 2/2004 Lee ..................... H04W 24/00
709/225
(Continued)

FOREIGN PATENT DOCUMENTS

WO 2005060209 A1 6/2005
WO 2012002757 A2 1/2012
(Continued)

OTHER PUBLICATIONS

Zanetti, G.P., et al., "Non-invasive Node Detection in IEEE 802.11 Wireless Networks," 2010 IFIP Wireless Days (WD 2010), Oct. 20, 2010, pp. 1-5, IEEE, Venice, Italy.
(Continued)

*Primary Examiner* — Sithu Ko
(74) *Attorney, Agent, or Firm* — Coats & Bennett PLLC

(57) ABSTRACT

The disclosure relates to wireless networks, and more specifically to multiple access networks. This present disclosure provides for a method in a wireless device, for predicting Quality of Service of a possible future connection between the wireless device and one or more wireless networks. The predicted Quality of Service may be used e.g. for making a handover decision. The disclosed method comprises detecting an access point of a first wireless network within range of the wireless device. The method further comprises determining the number of devices already being connected to the
(Continued)

access point and calculating the predicted Quality of Service based on the determined number of devices already being connected to the access point. The disclosure further relates to a wireless device and to a computer program.

15 Claims, 9 Drawing Sheets

Related U.S. Application Data

(60) Provisional application No. 61/770,578, filed on Feb. 28, 2013.

(51) Int. Cl.
| | |
|---|---|
| *H04W 36/00* | (2009.01) |
| *H04W 36/16* | (2009.01) |
| H04W 88/06 | (2009.01) |
| H04W 36/30 | (2009.01) |
| H04W 48/18 | (2009.01) |

(52) U.S. Cl.
CPC ... *H04W 36/00837* (2018.08); *H04W 36/165* (2013.01); *H04W 36/30* (2013.01); *H04W 48/18* (2013.01); *H04W 88/06* (2013.01)

(56) References Cited

U.S. PATENT DOCUMENTS

| | | | | |
|---|---|---|---|---|
| 2004/0171402 A1* | 9/2004 | Tamaki | ................. | H04W 74/02 455/522 |
| 2005/0208950 A1* | 9/2005 | Hasse | ................... | H04L 47/125 455/453 |
| 2005/0215265 A1* | 9/2005 | Sharma | ................. | H04L 47/125 455/453 |
| 2006/0025149 A1* | 2/2006 | Karaoguz | .......... | H04N 21/4126 455/452.2 |
| 2006/0025151 A1 | 2/2006 | Karaoguz et al. | | |
| 2006/0234755 A1* | 10/2006 | Jonsson | ................ | H04W 48/20 455/525 |
| 2008/0102852 A1* | 5/2008 | Du | ........................ | H04W 48/20 455/453 |
| 2008/0316985 A1* | 12/2008 | Kostic | .................... | H04L 47/10 370/338 |
| 2009/0170501 A1 | 7/2009 | Olson | | |
| 2011/0134865 A1* | 6/2011 | Gaur | ..................... | H04W 72/02 370/329 |
| 2011/0188458 A1* | 8/2011 | Sebeni | .................. | H04L 1/0015 370/329 |
| 2012/0128090 A1* | 5/2012 | Seok | ..................... | H04W 48/20 375/267 |
| 2012/0224483 A1* | 9/2012 | Babiarz | .............. | H04L 43/0847 370/232 |
| 2012/0300647 A1 | 11/2012 | Nandagopal et al. | | |
| 2014/0044005 A1* | 2/2014 | Keys | ................... | H04W 16/225 370/254 |

FOREIGN PATENT DOCUMENTS

| | | |
|---|---|---|
| WO | 2012096441 A2 | 7/2012 |
| WO | WO2012118414 A1 * | 9/2012 ............ H04W 72/04 |

OTHER PUBLICATIONS

Wu, H., et al., "Proactive Scan: Fast Handoff with Smart Triggers for 802.11 Wireless LAN," 26th IEEE International Conference on Computer Communications, May 6, 2007, pp. 749-757, IEEE, Anchorage, AK.

\* cited by examiner

PREDICTION OF QUALITY OF SERVICE OF A POSSIBLE FUTURE CONNECTION OF A DEVICE TO A WIRELESS NETWORK

RELATED APPLICATIONS

This application is a continuation of U.S. application Ser. No. 14/765,888, filed Aug. 5, 2015, which was the National Stage of International Application No. PCT/EP2014/052527, filed Feb. 10, 2014, which claims the benefit of U.S. Provisional Application No. 61/770,578, filed Feb. 28, 2013, which claims the benefit of EP Application No. 13155437.0, filed Feb. 15, 2013, the disclosures of each of which are incorporated herein by reference in their entirety.

TECHNICAL FIELD

The present disclosure relates to wireless networks, and more specifically to multiple access networks. The present disclosure relates to methods for prediction of Quality of Service of a possible future connection of a wireless device to a wireless network. It further relates to a wireless device configured to perform the methods.

BACKGROUND

Today wireless devices, such as mobile phones, typically support other wireless technologies such as Wireless Local Area Networks, commonly referred to as in addition to the cellular standards. As a means to improve the network capacity in future networks, W-Fi is intended to be an integral part. That is, W-Fi will be regarded as just another radio access technology, so that a connection or handover can be made to Wi-Fi without the user noticing that the service is no longer being carried by 3GPP technologies like WCDMA or LTE.

Presently this kind of handover is controlled by the wireless device, rather than by the network, due to that the Wi-Fi network is still not sufficiently tightly integrated with the cellular networks using 3GPP technologies. However, using Wi-Fi is from a user perspective often preferred, because of the lower cost associated with it. Therefore, a handover is often performed to W-Fi as soon as a W-Fi network is detected and the signal strength is sufficiently high. Hence, when a wireless device is in range of a W-Fi network it will typically connect to this wireless network when the received signal strength indication, RSSI, is sufficiently high, without further analysis.

Prior art published patent application documents US2006025149 and US2006025151 disclose devices performing background scanning for detecting a second network while being connected to a first, to decide, for example, whether to make adjustments to the current level of service being provided, or to switch from use of a first communication network to add or switch to a second communication network. The cited prior art document US2006025149 states that the wireless performance prediction attributes used in such a decision may be based on a signal-to-noise ratio (SNR), a frame error rate, a fading characteristic of the communication link, and a measure of throughput, to name only a few examples.

However, it has turned out that sometimes the actual performance which can be supported by a wireless network, might be poor although the predicted performance is high. One example is that the received signal has a very high level and/or quality, but that the data rate that a user gets once connected to the network is very low. This leaves a high amount of uncertainty to the users, because the Signal Strength Indicator, which is typically displayed in the user interface, will then not correspond to the actual performance. Hence, wireless devices cannot avoid connecting or handing over to wireless networks which cannot provide the required performance. As a result of poor performance, users tend to completely turn off W-Fi, which of course overturns the idea of W-Fi as a means to improve the performance.

SUMMARY

This present disclosure provides a method for predicting a Quality of Service, QoS, of a possible future connection to a wireless network, by determining the number of devices connected to e.g. an access point of the wireless network. In this way additional information is obtained concerning the load of the access point and distribution of the load among the devices, which may be used e.g. for deciding whether to connect to the network.

According to one aspect, a method is provided in a wireless device, for predicting Quality of Service of a possible future connection between the wireless device and one or more wireless networks. The method comprises detecting an access point of a first wireless network within range of the wireless device. The method further comprises determining the number of devices already being connected to the access point and calculating the predicted Quality of Service based on the determined number of devices already being connected to the access point. By considering the number of devices already connected to the wireless network an improved prediction of the QoS may be obtained.

According to one aspect, the determination of the number of connected devices implies signal analysis in the analogue domain of one or several channels, over which devices connected to the access point, communicate. Such a solution is simple, because it does not require processing of the packet in the digital domain.

According to one aspect, the signal analysis implies identifying the presence of different signal levels (e. g. power or amplitude signal levels) on one or several channels over which devices connected to the access point communicate.

According to one aspect, the determination of the number of connected devices implies packet inspection of packets exchanged between the devices and the access point.

According to one aspect, it further comprises estimating channel utilisation of the access point, wherein the estimated channel utilisation is an input to the step of calculating the predicted Quality of Service, so that the predicted Quality of Service is calculated from the determined number of devices connected to the access point and the estimated channel utilisation of the access point. According to one example, the channel utilisation is estimated per device and the calculation of predicted Quality of Service is further based on the estimated channel utilisation per connected device. It has turned out that the influence of the number of connected devices is higher at high load or channel utilisation. Hence, a calculation taking into account both aspects may provide a more fine grained prediction.

According to one aspect, it further comprises deciding whether to connect to the first wireless network or not based on the predicted Quality of Service. According to one exemplary technique, the device is connected to a second wireless network and the connection to the first network implies a handover to the first wireless network. According to this aspect, it provides for an improved method of making handover decisions.

According to one aspect, it relates to a computer program comprising computer program code which, when executed in a wireless device, causes the wireless device to execute the method described above.

According to another aspect, it relates to a wireless device configured to predict Quality of Service of a possible future connection between the wireless device and one or more wireless networks. The wireless device comprise a wireless communication unit configured to communicate with a node of said one or more wireless networks. The wireless device further comprises a processor circuitry being configured to detect an access point of a first wireless network within range of the wireless device, determine the number of devices already being connected to access point and calculate the predicted Quality of Service based on the determined number of devices being connected to the access point. According to further aspects of this disclosure, the processor circuitry is further configured to execute all the aspects and examples of the method as described above and below.

With the above description in mind, the object of the present disclosure is to overcome at least some of the disadvantages of known technology as previously described.

BRIEF DESCRIPTION OF THE DRAWINGS

The present disclosure will be more readily understood through the study of the following detailed description of the embodiments/aspects together with the accompanying drawings, of which.

Figure 1A:
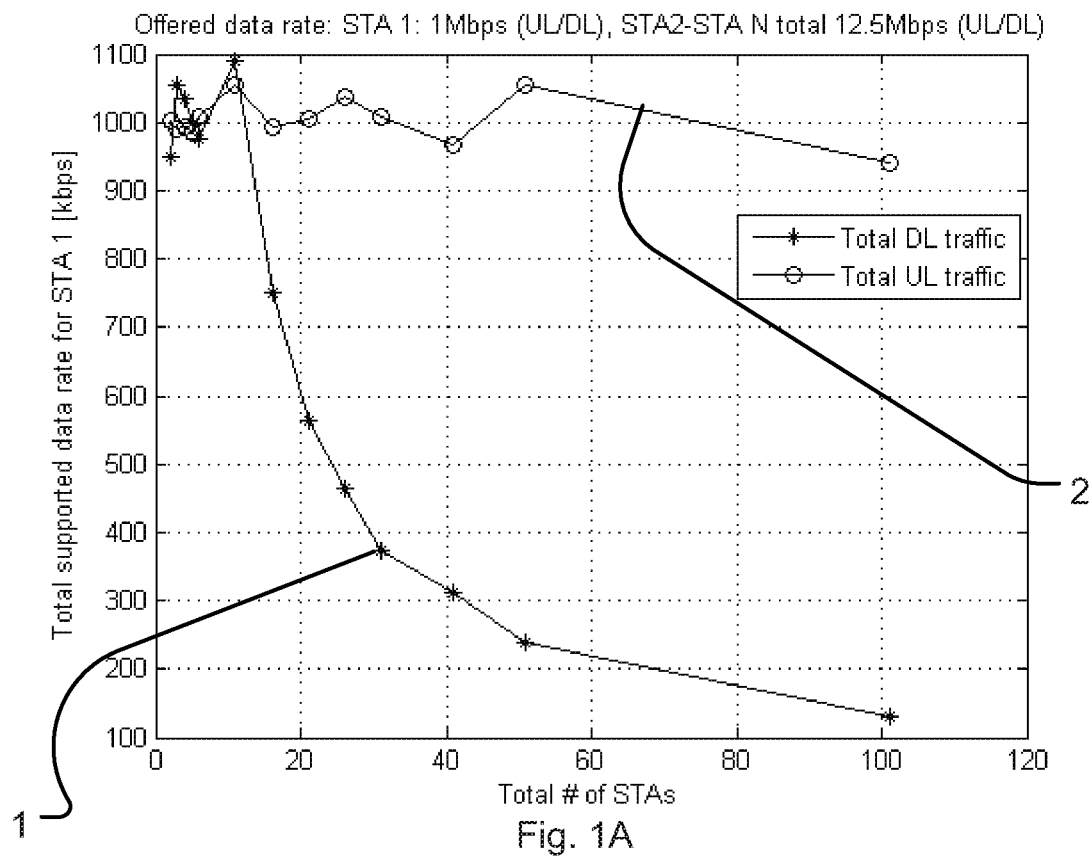
FIGS. 1A to 1D show simulations of the performance of a Wi-Fi network.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address one or more of the disadvantages with the prior art solutions described above as well as below. The various steps described below in connection with the figures should be primarily understood in a logical sense, while each step may involve the communication of one or more specific messages depending on the implementation and protocols used.

The present technique is based on the presumption that many times there are too many wireless devices which have high signal strength from a wireless network and therefore choose to connect to a particular wireless network. This might result in that only a very low data rate can be supported to a particular wireless device, although the signal strength is very high. Furthermore, having many devices connected to the same access point increases the risk of collision and interference between devices.

A typical example of the scenario above is a W-Fi network. W-Fi networks use CSMA/CA, Carrier Sense Multiple Access/Collision Avoidance to ensure that only one network node is transmitting at any one time. Carrier Sense implies that every wireless device listens to the channel before it attempts to transmit. If the wireless device senses that another device is transmitting, it will wait to transmit. Collision Avoidance means that if the channel is sensed as busy, the device or station (STA) defers its transmission. Ideally this will ensure that no collisions occur. However, there is a small chance that two or more devices sense the channel as being idle and therefore start to transmit. When a packet is lost in this way, it is assumed that a collision has taken place and each node waits a random amount of time before transmitting again.

Collisions are normal on a CSMA/CA network. A small amount of collisions are expected in the protocol design. However, if too many devices or nodes are transmitting on a CSMA/CA network, the number of collisions can rise to an unacceptable level. This can reduce the amount of available bandwidth on a network because part of the bandwidth is lost as it is needed in retransmission.

FIGS. 1A-1D show simulations that have been performed in a W-Fi network, to investigate how Quality of Service parameters are affected by the number of devices or stations (STA) attached to a wireless network. In the simulations the effect of the total load of a wireless network has also been investigated. In these simulations Quality of Service has been estimated by looking at how bit-rate and delay vary dependent on the number of devices attached and the total load.

What is simulated is performance at one access point, AP, with a varying number of devices or stations, STA, being connected. The total supported data rate of an access point depends on the situation and is affected e.g. by the number of connected devices. In these simulations the total supported data rate has turned out to be about 25 Mbps. In this example, STA1 is the device that is a candidate for being connected to the network. In the example shown in FIGS. 1A and 1B, the total load of the already connected devices (STA2 up to STA N) is 12.5 Mbps in uplink and 12.5 Mbps in downlink. Hence, the channel utilization is in this case essentially 100%. In this example the requested data rate of STA 1 is 1 Mbps for both uplink and downlink. The simulation is made for Transmission Control Protocol, TCP, traffic with packets of 1500 Bytes. The downlink destination is chosen based on Round Robin when the access point accesses the channel. No priority is given to the access point. Hence, the share of the access point is equal to the share of each STA i.e. 25/(N+2) Mbps.

Figure 1B:
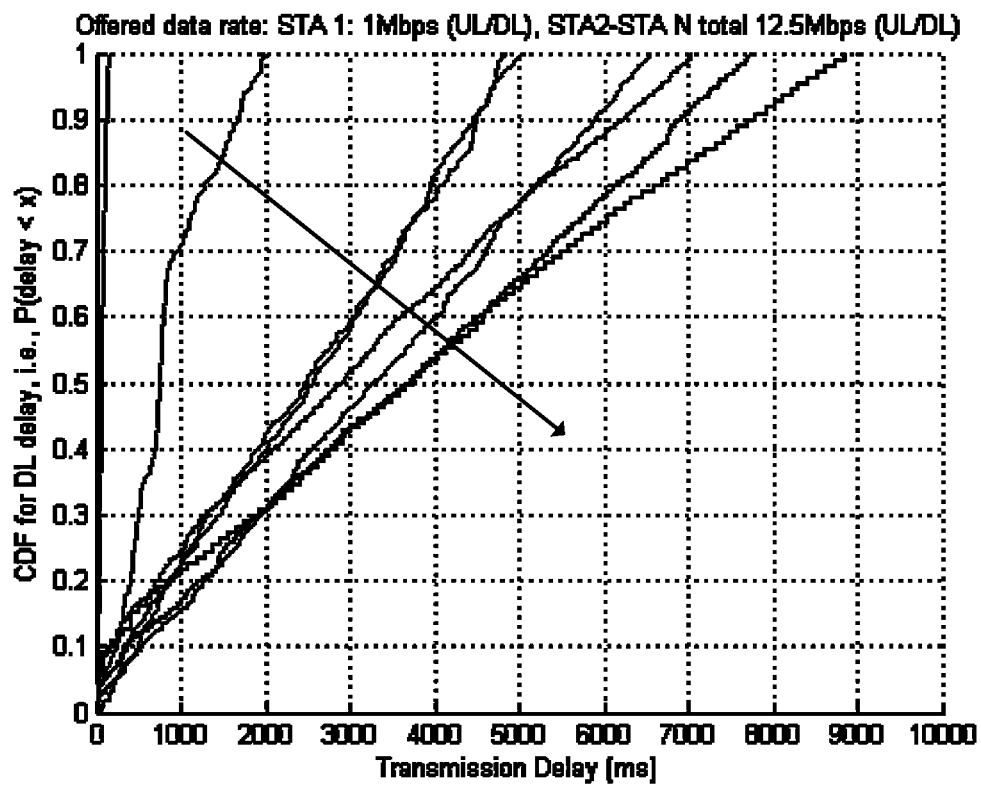
Figure 1C:
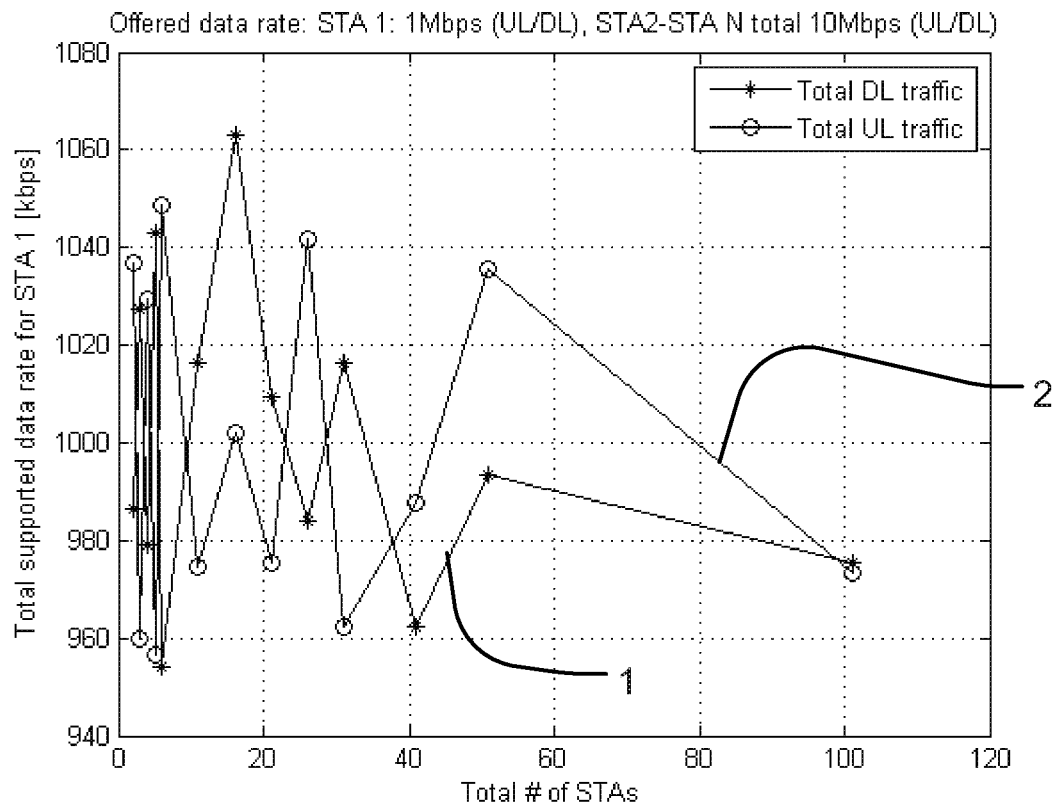

In FIGS. 1A and 1C the y-axis represents the total supported data rate for STA1 and the x-axis represents the number devices connected to the access point (Total # of STAs). FIG. 1A shows how the supported downlink data rate 1 for STA1 (y-axis) decreases with the number of devices connected to the access point (Total # of STAs, x-axis). The reason is that the share for the downlink decreases with the number of connected devices or stations. However, because there is not data for all N+1 STAs at all times the increase will not be proportional to the number of devices.

In contrast, in these simulations the supported uplink data rate 2 is not visibly affected by an increased number of devices. The reason is that STA 2-STA N do not transmit its full bit rate at all times, which implies that STA 1 will be offered more than its share even in the case of many already connected devices. If priority would be given to the downlink, then UL and DL would be more equally affected by the increase in the number of devices.

Correspondingly, FIG. 1B shows how the Cumulative Distribution Function, CDF, for UL and DL transmission delays relate to the number of devices. In FIG. 1B the x-axis represents the delay and the y-axis represents the CDF. Each line corresponds to a number N of previously connected devices. FIG. 1B shows that the CDF moves towards longer transmission delays when the number of connected devices N is increased as illustrated by the arrow.

Figure 1D:
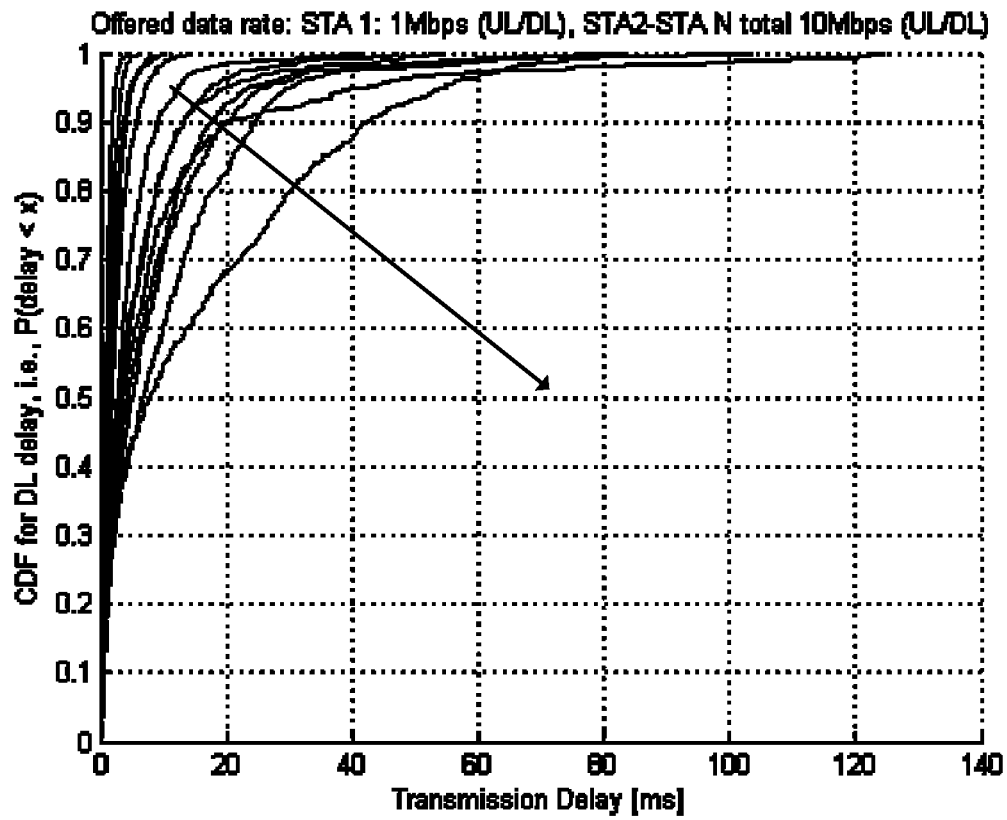

A further example is shown in FIGS. 1C and 1D. In this example the prerequisites are the same, except that the load of the previously connected devices is 10 Mbps in uplink and 10 Mbps in downlink. Hence, the channel utilization is around 80% on average. FIG. 1C shows that when the network load is not 100%, the effect of the number of stations on the supported downlink data rate 1 is less than in the example where the network load is close to 100%. A similar effect is visible regarding the transmission delay shown in FIG. 1D, which is less affected by the number of stations, than in the example of FIG. 1B. The general conclusion is that high traffic is problematic with several connected devices and full load of the access point.

Embodiments of the present disclosure relate, in general, to Wi-Fi networks using CSMA/CA and to the situation where a device is making a handover from a cellular network, e.g. a LTE network, to a short range network. However, it must be understood that the same principle is applicable in any multiple access network, where the Quality of Service is affected by the number of attached or connected devices.

In this application the term wireless device is generally used. A wireless device, or user equipment, UE, which is the term used in the 3GPP specifications, referred to in this application could be any wireless device capable of communicating with a wireless network. Examples of such devices are mobile phones, smartphones, laptops and Machine to Machine, M2M, devices etc. However, one must appreciate that capability to communicate with a wireless network could be built in almost any device e.g. a car, a lamp post, a scale and so on.

An access point in this application refers to a device in a wireless network that transmits and receives data. The access point connects devices to other devices within the network and also can serve as the point of interconnection between the network and a fixed wire network or another wireless network. Each access point can serve multiple devices within a defined network area or range. A small Wi-Fi network may only require a single access point. However, the number required increases as a function of the number of network devices or users and the physical size of the network.

Quality of Service in this application refers to the ability of a connection to reserve requested resources. Parameters defining QoS in a packet switched network are typically bit rate, throughput, transmission delay, delay jitter (e.g. deviation from a minimum possible transmission delay) and error rate.

Hence, the technique of this disclosure provides for a way to predict the Quality of Service that a wireless device would get if it connects to a wireless network based on determining the number of devices already being attached to the wireless network. The general object or idea is to make a prediction of the Quality of Service taking into account the number of devices already being connected to the access point of the wireless network to which the wireless device intends to connect.

Figure 2:
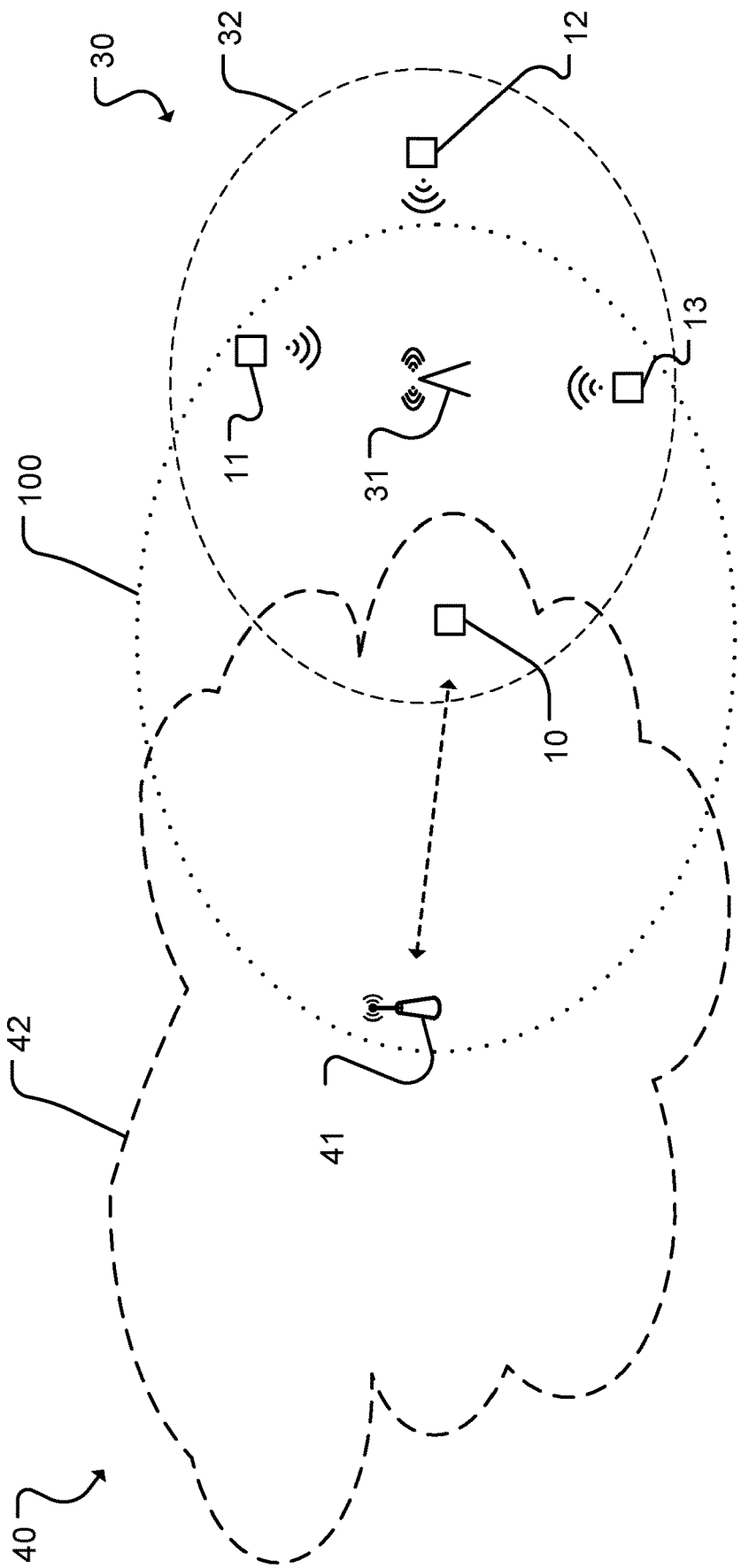
FIG. 2 illustrates a wireless device being within the range of two wireless networks.

FIG. 2 illustrates a system where the method of predicting QoS can be performed. The system comprises a wireless device 10, cellular network 40 and a wireless network 30. The wireless network 30 is a packet switched wireless network, e.g. a W-Fi network. In this example the wireless device 10 is connected to the cellular network 40 via a base station 41. The wireless device 10 is positioned within the cell 42 defined by the base station 41. The wireless device 10 is also within the range 32 of wireless communication network 30 having an access point 31. The resources of the wireless network 30 are shared among devices connected to the network. Hence, the network 30 is the network that the device needs to decide whether to connect to or not. As mentioned before such a decision is based on the connection characteristics of the connection between the wireless device 10 and the cellular network 40 and on the predicted QoS of a future connection between the wireless device 10 and the W-Fi network 30.

The method for predicting Quality of Service of a possible future connection between the wireless device 10 and one or more wireless networks 30 on a shared channel will now be described referring to FIG. 3 in combination with FIG. 2.

In the first step the wireless device 10 detects 310 a first wireless network 30 within range 100 of the wireless device 10. The range 100 of the wireless device 10 is defined as a distance within which the wireless device 10 may communicate. Wireless networks are typically detected by scanning the relevant frequencies for a beacon, e.g. the 2.4 GHz band if the wireless device comprises a Wi-Fi circuit. A Wi-Fi access point transmits beacon frames at regular intervals to announce the existence of the wireless network. The scanning may be manually triggered or the device may continuously scan for Wi-Fi networks.

In the next step the wireless device determines 320 the number of devices 11-13 already being connected to the first wireless network 30. This might be achieved in the analog domain or in the digital domain, see FIG. 4 which illustrates step 320 in further detail.

Figure 4:
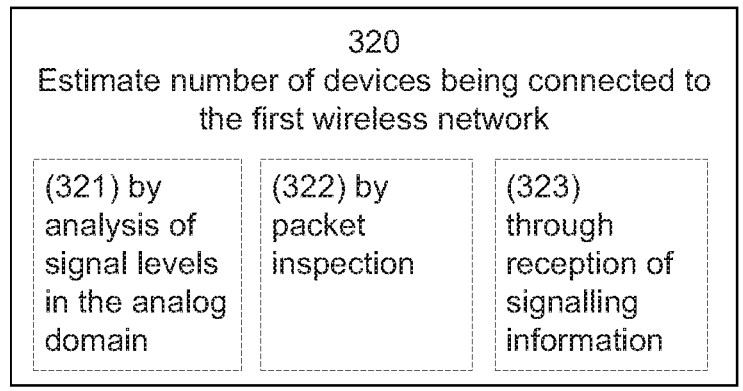
FIG. 4 illustrates the step of determining the number of devices being connected to the first wireless network in more detail.

According to one exemplary technique, illustrated in FIG. 4, determination 321 of the number of connected devices 11-13 implies signal analysis in the analogue domain of one or several channels over which devices 11-13 connected to the access point 31 communicate. For example different signal levels on a shared channel are identified. It may then be assumed that each signal level corresponds to one device, because the signal level is dependent on the transmitted signal level and the distance to the transmitter. Such an assumption may of course be wrong if there are two devices transmitting with equal signal strength and having very similar channel conditions to the device performing the signal level measurement. In any case such an analysis gives an indication on the number of connected devices. Hence, according to this example determination of the number of connected devices 11-13 implies identifying the presence of different signal levels on one or several channels over which devices 11-13 connected to the access point 31 communicate.

According to another exemplary technique, the number of connected devices 11-13 is determined 322 by packet inspection of packets exchanged between the devices 11-13 and the access point 31. Packet inspection, in contrast to analysis of signal levels in the analogue domain, involves processing packets in order to retrieve digital data such as source or destination addresses.

According to one exemplary technique, also illustrated in FIG. 4, the packet inspection is done by Media Access Control, MAC, address analysis, i.e. checking the source and destination address, which are available in the MAC header. This allows the wireless device to determine the number of other devices that are currently connected to the wireless network and to some extent active. Since the wireless device receives the packets from the access point 31 of the wireless network 31, it can identify if there are hidden nodes i.e. nodes that are out of range of the wireless device 100 but within range of the first wireless network 30. The reason is that by monitoring the packets, the address of a wireless device 10, which is not a hidden node, should appear as both source and destination, whereas for a hidden node, there will be no packets where this node is the source but only the destination. Hence, this exemplary technique provides for a way of finding hidden nodes 12. The latter is of great importance in trying to determine whether to connect to a certain wireless network or not. By also including knowledge of hidden nodes, the traffic load on the radio link can be more accurately estimated.

Alternatively, when determining the number of devices 11-13 connected to a certain access point 31, one might choose to only check the traffic from the access point and then only look for the number of different destination addresses.

According to a further exemplary technique, information about the number of devices connected to the wireless network 30 is determined through signalling from the wireless network. According to one aspect of the disclosure the step of determining 320 the number of connected devices 11-13 implies receiving 323 signalling information from the wireless network 30 comprising information about the of the number of devices 11-13 connected to the access point 31. The information can be received by devices within the range 32 of the access point 31. As an example, the number of connected devices is read out in the beacon of a WiFi network by a device that wants to predict QoS.

Figure 3:
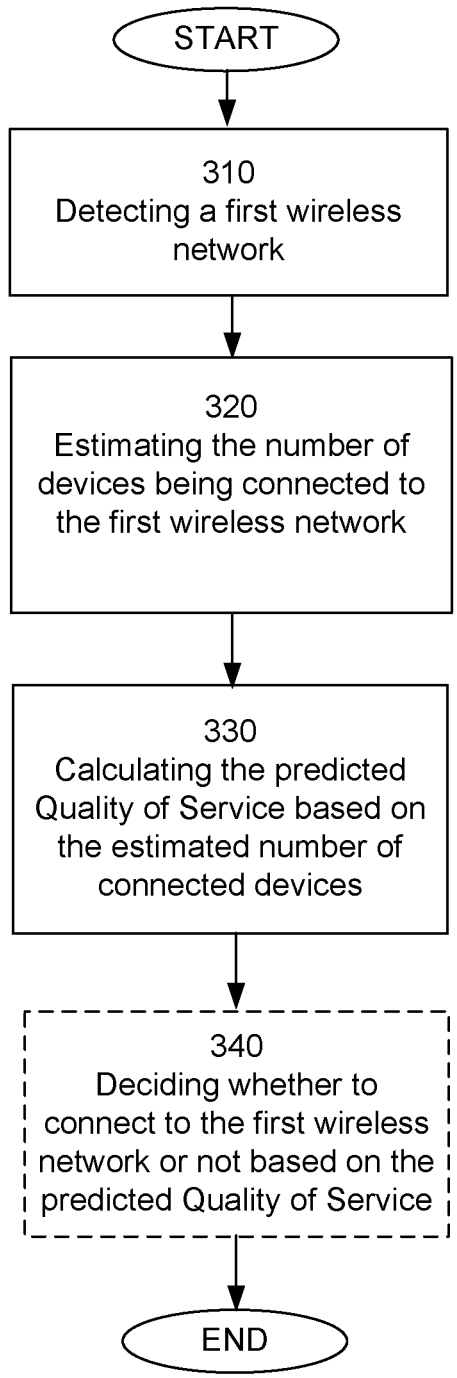
FIG. 3 is a flow chart illustrating the method performed by a wireless device according to an exemplary embodiment.

Returning now to the next step of FIG. 3, the wireless device 10 calculates 330 the predicted Quality of Service based on the determined number of devices being connected to the first wireless network 30. The calculation could be done in different ways. One way would be to use a lookup table, created based on simulations as the ones presented above.

Another way of calculating one or several QoS parameters e.g. throughput, or bit rate, transmission delay, delay jitter or error rate, is using a formula, where the number of devices is one parameter of the formula. Because the access to the wireless network 30 is generally based on multiple access the larger the number of devices connected, the smaller fraction of the channel time might potentially be available. Thus, the predicted Quality of Service is typically higher if the number of devices is low. Suppose for example N other devices are already connected, and suppose the data rate provided by the access point 31 is 25 Mbps. An added device or STA would get access $1/(N+2)$ of the time which implies that the maximum uplink data rate, MAX UL rate, may be defined as. MAX UL data rate=$25/(N+2)$ Mbps. This means that the previously connected devices, the new device and the access point will share the data resources, if no priority is given to the access point. Hence, the supported data rate may be calculated as a value depending on $1/(N+2)$. However, this formula assumes that there is data for all N+1 devices at all times. This is not always true for all devices, so a more realistic degradation factor would be $k/(N+2)$, where k is a constant (k>1) for taking into account that there is not data for all devices at all times.

Hence, the present technique provides for a method of predicting QoS of a possible future connection based on the number of the devices presently or already connected to the concerned access point, which implies a more accurate estimation of predicted QoS, in particular when the channel utilization is high.

Figure 5:
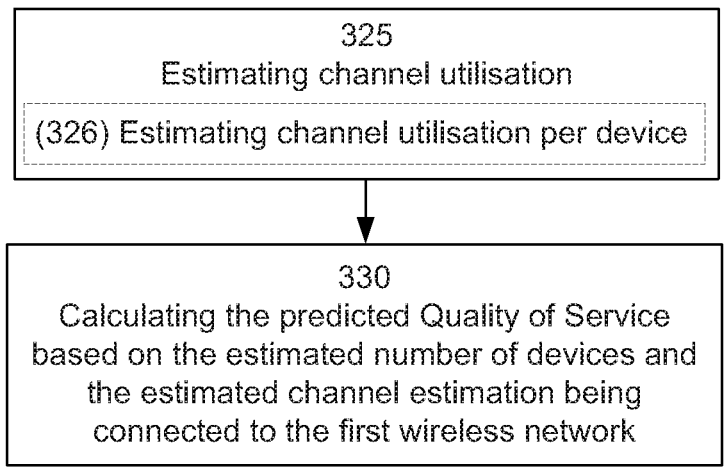
FIG. 5 illustrates the step of calculating the predicted Quality of Service in more detail.

It must be appreciated that the QoS is generally based on several parameters. According to the exemplary technique, the number of devices is one of several possible inputs when estimating a QoS parameter. According to one exemplary technique the method further comprises the step of estimating 325 channel utilisation of the first wireless network 30. FIG. 5 illustrates how a estimation step 325 is inserted before the determining of Quality of Service 330, corresponding to step 330 of FIG. 3, and how the calculation is then based on the determined number of devices being connected to the first wireless network and the estimated channel utilisation. As shown in FIGS. 1C and 1D the impact of the number of connected devices is affected by the channel utilisation. Therefore, calculating or estimating channel utilisation before calculating 330 the predicted Quality of Service is useful for a good estimation of QoS. Then the estimated channel utilisation is an input to the step of calculating 330 the predicted Quality of Service, so that the predicted Quality of Service is calculated from the determined number of devices connected to the first wireless network 30 and the estimated channel utilisation of the first wireless network.

According to this example both the fraction of the channel use and the number of connected devices are determined, which generally provides for a more accurate prediction of QoS. Then, the predicted Quality of Service is high if the number of connected devices is sufficiently small and the channel utilization is sufficiently small compared to the required data rate. One might of course elaborate with the numbers. If there is only one device or user connected to the first wireless network 30, the predicted QoS may be high even if the channel utilization is high, because the sole device will need to share its resources with an added device. However, the combination of a high number of connected devices and high channel utilization indicates that the QoS of a future connection will be low.

According to a further aspect of this disclosure the method in FIG. 3, further comprises deciding 340 whether to connect to the first wireless network 30 or not based on the predicted Quality of Service. Typically, the higher the data rate that is needed, the higher the Quality of Service should be for the device to take the decision to connect to the network.

According to one example of this technique the device 10 is already connected to a second wireless network 40, when the method is executed. In the example in FIG. 2 the second network 40 is a cellular network e.g. a LTE network. Then the connection to the first network typically implies a handover to the first wireless network 30, which in the example of FIG. 2 is a W-Fi network. Simultaneous connection to both networks would of course also be possible. This aspect of the disclosure provides for an improved method of making handover decisions, where networks providing low QoS despite high signal strength are avoided. This aspect of the disclosure allows for better user experience and in particular it may reduce the risk that users simply turn off W-Fi because of bad user experience. Hence, in this way it allows W-Fi to be better used for offloading the cellular network.

According to one example of this technique the decision to handover to the first wireless network 30 is further based on connection characteristics of the connection to the second wireless network 40. Connection characteristics include Quality of Service parameters as signal strength, bit-rate, transmission delay etc. It may also be other characteristics such as e.g. cost. It must be appreciated that the characteristics of the present connection is sometimes as important to the handover decision as the Quality of Service of the new connection. A user having very poor reception quality leading to bad QoS at the present connection would of course tolerate a lower QoS than a user having an acceptable data rate.

According to another exemplary technique, also illustrated by FIG. 5, the channel utilisation is estimated 326 per device and the calculation of predicted Quality of Service is further based on channel utilisation per connected device 11-13.

In this example not only the fractional load and the number of connected devices is determined, but the load for each one of the devices is estimated and used to determine what performance can be obtained if a connection is made to the access point of the first wireless network. By estimating the traffic to and from the devices individually, an improved estimation can be made concerning what capacity can be obtained if another device connects to the access point.

The principle will now be illustrated in FIGS. 6 and 7. However, for simplicity, in these examples the number of devices is limited to three. The size of the arrows in FIGS. 6 and 7 is illustrating the traffic load of each connection.

Figure 6A:
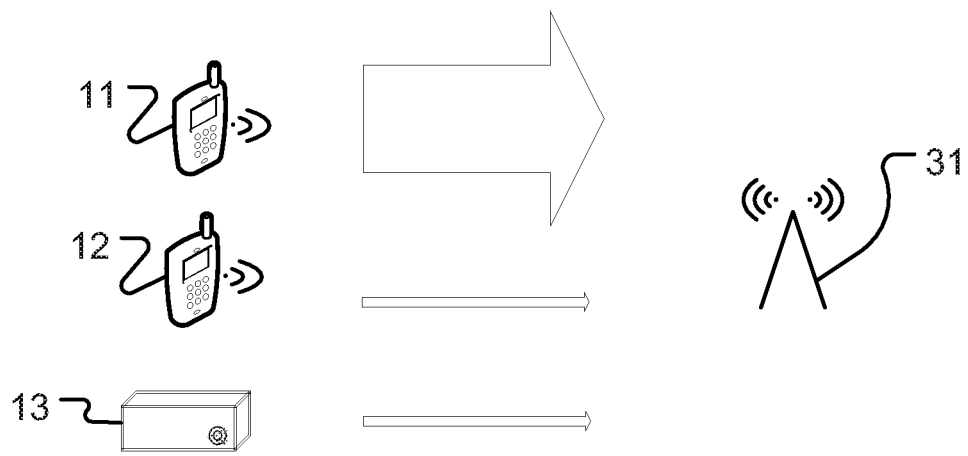
FIGS. 6A, 6B, 7A and 7B illustrate the principle of predicting Quality of Service of a possible future connection based on channel utilisation is estimated per device.
Figure 6B:
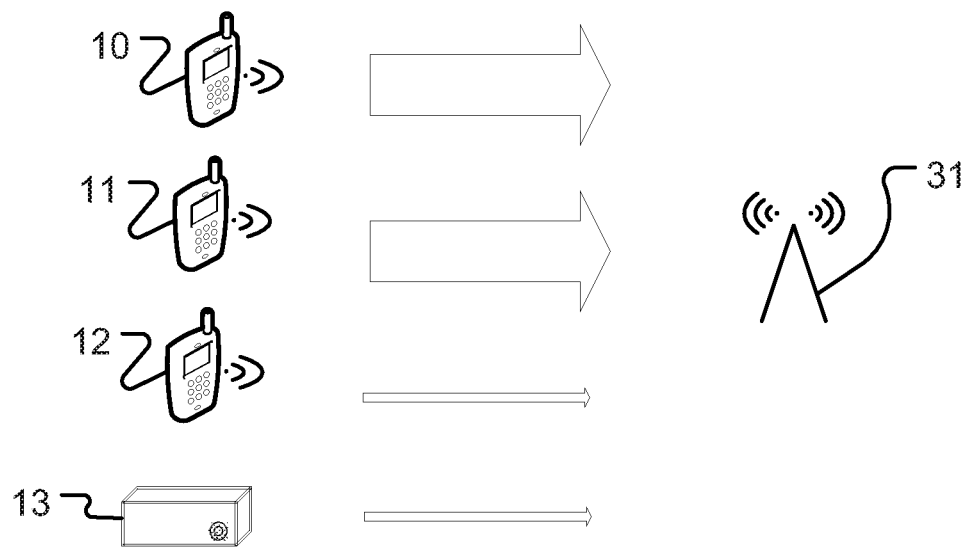

In the first example shown in FIG. 6A, the channel is fully occupied but only one of the devices 11 connected to the access point is responsible for almost all traffic, while device 12 and 13 consumes very little traffic. This means that if another device 10 connects to the wireless network, it can potentially get almost half the available capacity for the access point i.e. essentially sharing equally with the device that is currently generating almost all traffic, see FIG. 6B.

Figure 7A:
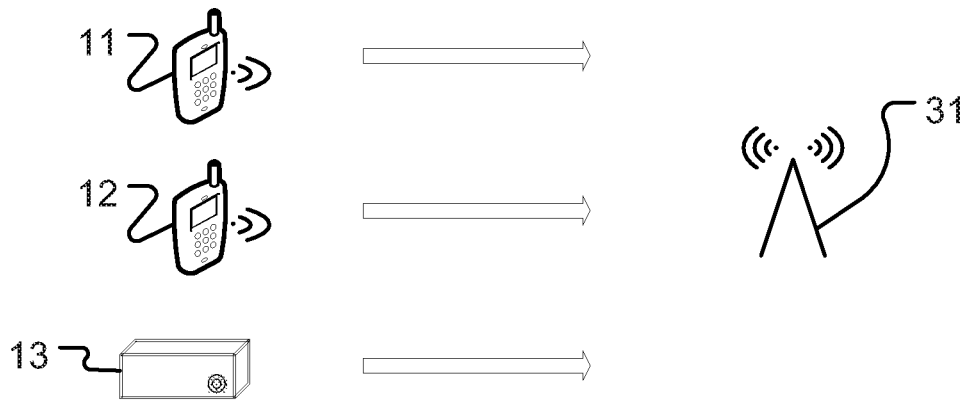
Figure 7B:
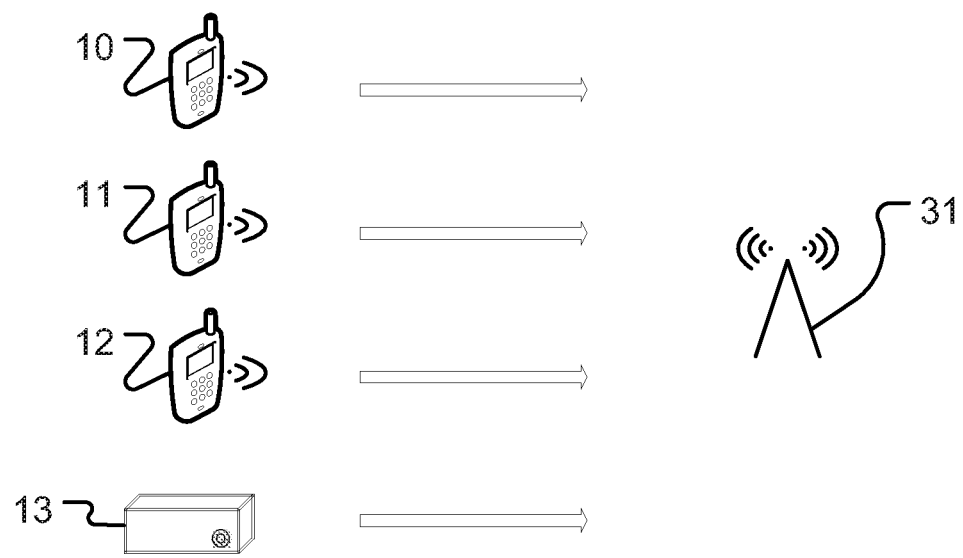

In contrast, as illustrated in FIGS. 7A and 7B, if the channel is fully occupied, but the traffic is generated uniformly among the devices 11-13, then if another device 10 connects to the access point, this will only get about 25% of the total capacity of that access point in this example.

According to one example of this technique it further relates to a computer program comprising computer program code which, when executed in a wireless device 10, causes the wireless device 10 to execute the method as described above. The present disclosure also relates to a computer program product storing such a program.

Figure 8:
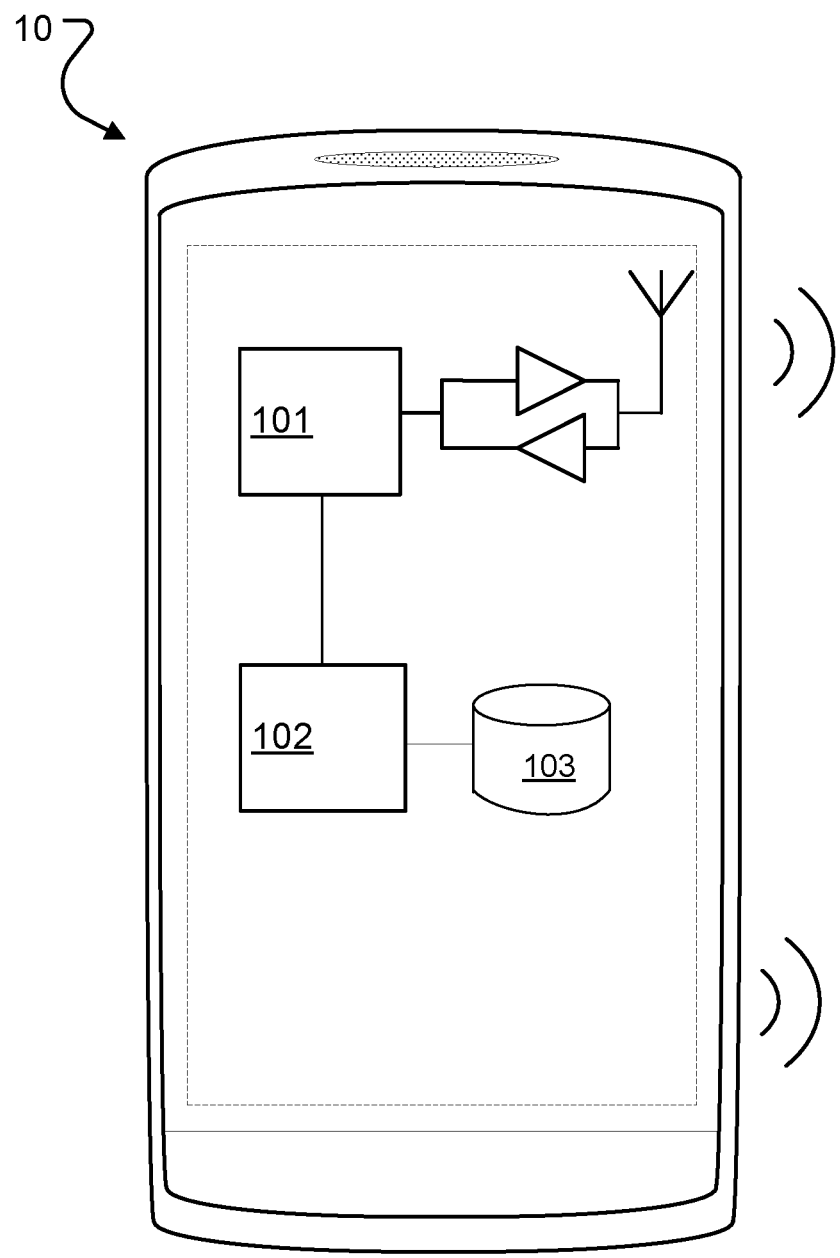
FIG. 8 illustrates a wireless device.

Turning now to FIG. 8 a schematic diagram illustrating some circuits or modules of an exemplary embodiment of the wireless device 10 will be described.

The wireless device 10 comprises a controller or a processor circuitry 102 that may be constituted by any suitable Central Processing Unit, CPU, microcontroller, Digital Signal Processor, DSP, etc., capable of executing computer program code. The computer program may be stored in a memory 103. The memory 103 can be any combination of a Read And write Memory, RAM, and a Read Only Memory, ROM. The memory 103 may also comprise persistent storage, which, for example, can be any single one or combination of magnetic memory, optical memory, or solid state memory or even remotely mounted memory. The wireless device 10 further comprises a wireless communication unit or a communication interface 101 arranged for wireless communication with other devices or nodes.

When the above-mentioned computer program code is run in the processor circuitry 102 of the wireless device 10 it is causes the processor circuitry 102 to detect an access point 31 of a first wireless network 30 within range of the wireless device 10, determine the number of devices 11-13 presently or already being connected to the access point 31 and calculate 330 the predicted Quality of Service based on the determined number of devices being connected to the first wireless network 30. The processor circuitry 102 is further adapted to execute all the aspects and examples of the method as described above.

Figure 9:
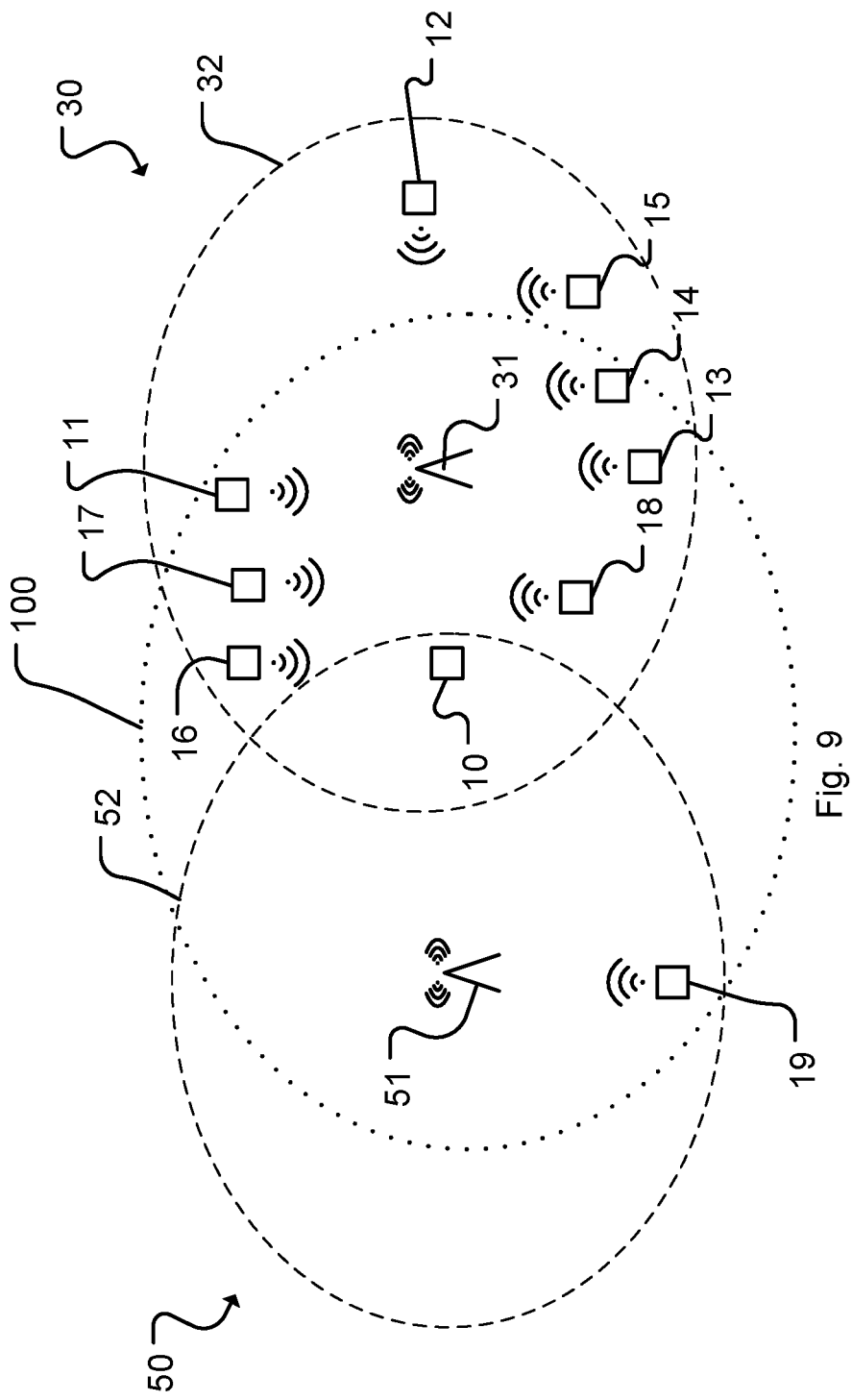
FIG. 9 illustrates a wireless device being within the range of two wireless networks.

Turning now to FIG. 9 another example of using the method for predicting Quality of Service of a possible future connection between the wireless device 10 and one or more wireless networks 30 is shown. In contrast to the previous example, the device 10 is not connected to any network.

In FIG. 9, the device 10 is within the range 32, 52 of two different wireless networks 30, 50. Both wireless networks may be short range packet switched wireless networks. Imagine that a user has just turned on the W-Fi functionality of a wireless device. The wireless device will then detect two wireless networks 30 and 50 and calculate the QoS for each respective network by taking in consideration the number of devices connected to each network. In this example, the signal strength is higher from the first network 30 than from the second network 50, because the wireless device 10 is closer to the access point 31 of the first network, than to the access point 51 of the second network 50.

However, in this example, there are eight devices 11-18 presently connected to the first network 30 and only one device 19 is presently connected to the second network 50. Hence, QoS calculated using the disclosed method may be higher for the second network, than for the first network, even if the SNR is higher is the first network 50. Thus, the device 10 may decide to connect to the second network and thereby achieving a higher bit rate or throughput.

Although aspect and examples of the proposed technique have been illustrated in the accompanying drawings and described in the description, it will be understood that the methods and apparatuses are not limited to the embodiments disclosed herein. In particular, the proposed technique is capable of numerous rearrangements, modifications and substitutions without departing from the scope of the disclosure as set forth and defined by the following claims.

The invention claimed is:

1. A method, in a wireless device, for predicting Quality of Service of a possible future connection between the wireless device and one or more wireless networks, the method comprising:
   detecting an access point of a first wireless network within range of the wireless device;
   estimating a first value indicating a channel utilization of the access point;
   determining a second value indicating a total number of devices already being connected to the access point, wherein the first value is different than the second value; and wherein the determining the second value indicating the total number of the devices comprises signal analysis in an analog domain of one or several channels over which devices connected to the access point communicate; and
   calculating the predicted Quality of Service based on the first value indicating the channel utilization of the access point and the second value indicating the total number of devices being connected to the access point.

2. The method of claim 1, wherein estimating the first value indicating the channel utilization of the access point comprises estimating traffic load per device and wherein calculating the predicted Quality of Service is further based on the estimated traffic load per connected device.

3. The method of claim 1, wherein the signal analysis comprises identifying the presence of different signal levels on one or several channels over which devices connected to the access point communicate.

4. The method of claim 1, wherein the determining the second value indicating the total number of connected devices comprises packet inspection of packets exchanged between the devices and the access point.

5. The method of claim 4, wherein the packet inspection involves Media Access Control (MAC) address analysis.

6. The method of claim 1, wherein the determining the second value indicating the total number of connected devices comprises receiving signaling information from the wireless network comprising information about the number of devices connected to the access point.

7. The method of claim 6, wherein the channel utilization is estimated per device; and wherein the calculating the predicted Quality of Service is further based on the estimated channel utilization per connected device.

8. The method of claim 1, further comprising deciding whether to connect to the first wireless network or not based on the predicted Quality of Service.

9. The method of claim 8:
wherein the wireless device is connected to a second wireless network; and
wherein the future connection to the first network comprises a handover to the first wireless network.

10. The method of claim 9, wherein the decision to handover to the first wireless network is further based on connection characteristics of the connection to the second wireless network.

11. The method of claim 1, wherein the first wireless network is Carrier Sense Multiple Access (CSMA) network.

12. The method of claim 9, wherein the second wireless network is a Cellular Network.

13. A computer program product stored in a non-transitory computer readable medium for predicting Quality of Service of a possible future connection between a wireless device and one or more wireless networks, the computer program product comprising software instructions which, when run on one or more processors of the wireless device, causes the wireless device to:

detect an access point of a first wireless network within range of the wireless device;
estimate a first value indicating a channel utilization of the access point;
determine, by signal analysis in an analog domain of one or several channels over which devices connected to the access point communicate, a second value indicating a total number of devices already being connected to the access point, wherein the first value is different than the second value; and
calculate the predicted Quality of Service based on the first value indicating the channel utilization of the access point and the second value indicating the total number of devices being connected to the access point.

14. A wireless device configured to predict Quality of Service of a possible future connection between the wireless device and one or more wireless networks, the wireless device comprising:
a wireless communication circuit configured to communicate with a node of the one or more wireless networks;
processing circuitry configured to:
detect an access point of a first wireless network within range of the wireless device;
estimate a first value indicating a channel utilization of the access point;
determine, by signal analysis in an analog domain of one or several channels over which devices connected to the access point communicate, a second value indicating a total number of devices already being connected to access point, wherein the first value is different than the second value; and
calculate the predicted Quality of Service based on the first value indicating the channel utilization of the access point and the second value indicating the total number of devices being connected to the access point.

15. The wireless device according to claim 14, wherein the processing circuitry is configured to:
estimate a first value indicating the channel utilization of the access point by estimating traffic load per device; and calculate the predicted Quality of Service further based on the estimated traffic load per connected device.

* * * * *